(12) United States Patent
Ruiz et al.

(10) Patent No.: US 11,585,427 B2
(45) Date of Patent: Feb. 21, 2023

(54) LUBRICATION ARRANGEMENT FOR A TRANSMISSION

(71) Applicant: DEERE & COMPANY, Moline, IL (US)

(72) Inventors: Francisco De Asis F Ruiz, Madrid (ES); Jorge J. Moreno, Madrid (ES); Daniel Vergara Martinez, Madrid (ES); Jonathan D. Bridges, Waterloo, IA (US); Prashant M. Jundale, Solapur (IN)

(73) Assignee: DEERE & COMPANY, Moline, IL (US)

( * ) Notice: Subject to any disclaimer, the term of this patent is extended or adjusted under 35 U.S.C. 154(b) by 268 days.

(21) Appl. No.: 17/065,564

(22) Filed: Oct. 8, 2020

(65) Prior Publication Data

US 2021/0116014 A1 Apr. 22, 2021

(30) Foreign Application Priority Data

Oct. 10, 2019 (DE) .......................... 102019215554.5

(51) Int. Cl.
*F16H 57/04* (2010.01)
*F16H 57/02* (2012.01)

(52) U.S. Cl.
CPC ......... *F16H 57/0423* (2013.01); *F16H 57/02* (2013.01); *F16H 57/0457* (2013.01); *F16H 57/0471* (2013.01); *F16H 57/0486* (2013.01); *F16H 2057/02082* (2013.01)

(58) Field of Classification Search
CPC .. F16H 57/0423; F16H 57/02; F16H 57/0457; F16H 57/0471; F16H 57/0486; F16H 2057/02082

USPC ........................................................ 184/11.2
See application file for complete search history.

(56) References Cited

U.S. PATENT DOCUMENTS

| 3,182,527 A | 5/1965 | Bryan |
| 3,383,937 A | 5/1968 | Toenne et al. |
| 2007/0191168 A1* | 8/2007 | Corless ............... F16H 57/0483 74/606 R |
| 2012/0129614 A1* | 5/2012 | Knoblauch ......... F16H 57/0427 464/7 |
| 2013/0283955 A1 | 10/2013 | Araki et al. |

(Continued)

FOREIGN PATENT DOCUMENTS

| DE | 2744344 C3 | 11/1981 |
| DE | 2745564 C2 | 5/1982 |
| DE | 102012210695 A1 | 1/2014 |

OTHER PUBLICATIONS

European Search Report issued in counterpart application No. 20195024.3 dated Feb. 8, 2021 (11 pages).

*Primary Examiner* — Colby M Hansen (57) ABSTRACT

A lubrication arrangement includes at least one housing, at least one shaft, at least one bearing system configured to hold the at least one shaft in the at least one housing and to permit the at least one shaft to rotate, lubricant distributed in the at least one housing with the rotation of the at least one shaft, and a lubricant deflector provided in a stationary manner relative to the at least one housing above the at least one shaft. The lubricant strikes against the lubricant deflector and, by action of gravity, the lubricant is conducted to the at least one bearing system of the at least one shaft so that the at least one bearing system is supplied with the lubricant.

17 Claims, 6 Drawing Sheets

(56) References Cited

U.S. PATENT DOCUMENTS

| | | | |
|---|---|---|---|
| 2022/0007584 A1* | 1/2022 | Vergara Martinez | ................ F16H 63/302 |
| 2022/0205516 A1* | 6/2022 | Ta | ................ F16H 57/021 |

* cited by examiner

LUBRICATION ARRANGEMENT FOR A TRANSMISSION

RELATED APPLICATION

This application claims priority under 35 U.S.C. § 119 to German patent application DE 102019215554.5, filed Oct. 10, 2019, the disclosure of which is incorporated herein by reference in its entirety.

BACKGROUND

The present disclosure relates to a lubrication arrangement for a shaft and the bearing system thereof. The present disclosure further relates to a transmission having such a lubrication arrangement and a harvesting machine having such a lubrication arrangement.

Transmissions and drive devices having transmissions for drivable processing devices on harvesting machines are used in many different forms. Thus, for example, DE 2 745 564 C2 discloses a drive device for a processing device of a combine harvester, having a belt drive and a belt pulley which is arranged on a hollow shaft which is concentric to a main drive shaft. A drive gear is arranged on the hollow shaft and a shifting element is provided. The shifting element is axially displaceable into two positions and selectively connecting the main drive shaft in each case to a gear which has a different rotational direction and which is connected to the drive gear, wherein the shifting element in a first position connects a sun gear of a planetary transmission via planet gears and a second sun gear to the main drive shaft and in a second position connects the sun gear of the planetary transmission via planet gears and a ring gear carrier to the main drive shaft. DE 2 744 344 C3 also discloses a drive device for harvesting machines having a belt drive which has an output pulley rotatably mounted on an output shaft. The belt drive is able to be drive-connected directly, or indirectly via a selectively engageable reduction gear, to an output shaft, for example to an output shaft for a threshing drum.

SUMMARY

Various aspects of examples of the present disclosure are set out in the claims.

In accordance with an embodiment of the present disclosure, a lubrication arrangement includes at least one housing, at least one shaft, at least one bearing system configured to hold the at least one shaft in the at least one housing and to permit the at least one shaft to rotate, lubricant distributed in the at least one housing with the rotation of the at least one shaft, and a lubricant deflector provided in a stationary manner relative to the at least one housing above the at least one shaft. The lubricant strikes against the lubricant deflector and, by action of gravity, the lubricant is conducted to the at least one bearing system of the at least one shaft so that the at least one bearing system is supplied with the lubricant.

The lubricant deflector may be fastened in a housing region adjacent to a bearing. The at least one housing may have a bore, and the lubricant may be configured to drain off the lubricant deflector into the bore by the action of gravity. The lubricant deflector may be directly fastened in the bore. The lubricant deflector may have an impact surface oriented parallel to a longitudinal axis of the at least one shaft so that the lubricant is spun onto the impact surface and runs down the lubricant deflector. The lubricant deflector may be a tube with an opening at an upper end provided counter to a rotational direction of the at least one shaft, so that the lubricant is conveyed into the opening by the rotation and runs down inside the tube. The lubricant deflector may have a substantially L-shaped cross section. The lubricant deflector may have a substantially U-shaped cross section.

In accordance with an embodiment of the present disclosure, a transmission arrangement having a lubrication arrangement includes at least one housing, at least one shaft, at least one bearing system configured to hold the at least one shaft in the at least one housing and to permit the at least one shaft to rotate, lubricant distributed in the at least one housing with the rotation of the at least one shaft, and a lubricant deflector provided in a stationary manner relative to the at least one housing above the at least one shaft. The lubricant strikes against the lubricant deflector and, by action of gravity, the lubricant is conducted to the at least one bearing system of the at least one shaft so that the at least one bearing system is supplied with the lubricant.

In accordance with an embodiment of the present disclosure, a harvesting machine having a lubrication arrangement includes at least one housing, at least one shaft, at least one bearing system configured to hold the at least one shaft in the at least one housing and to permit the at least one shaft to rotate, lubricant distributed in the at least one housing with the rotation of the at least one shaft, and a lubricant deflector provided in a stationary manner relative to the at least one housing above the at least one shaft. The lubricant strikes against the lubricant deflector and, by action of gravity, the lubricant is conducted to the at least one bearing system of the at least one shaft so that the at least one bearing system is supplied with the lubricant.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one embodiment of the subject matter of this disclosure is understood by referring to FIGS. 1 through 10 of the drawings.

Shifting devices for transmissions, in particular also in combination with belt drives, are used in agricultural machines, in particular harvesting machines with processing devices for collected harvested crops. These harvesting machines include, for example, combine harvesters, forage harvesters or sugar cane harvesters, or even other harvesting machines which provide processing for collected harvested crops in the machine. Thus, when harvesting the harvested crops, threshing, chopping, cutting or a different type of processing may be provided in the flow of harvested crops, wherein different drive stages and thus a variation in speed are provided for the processing devices, such as for example a chopping drum.

Thus, for example, combine harvesters with chopping devices may be connected downstream of a threshing device and a screen device and undertake the chopping of the remaining harvested crops. Such chopping devices comprise chopping drums which, driven by a belt drive, are drivable, for example, at two different speeds via a corresponding transmission. The different speeds serve for adapting the chopping device specifically to the harvested crops and for requests by the operator relative to the chopping output (chopping length of the harvested crops). At the same time, threshing operations without a chopping operation arranged downstream thereof are also desired by the operator. Chopping devices are generally driven by belt drives, wherein the belt drive leads from a belt pulley connected to the drive motor of the harvesting machine. Thus the chopping device is generally directly associated with the speed of the drive motor, which has the result that even the components on the chopping device such as the seals, bearings or lubricating system are directly influenced by the speed of the drive motor. Since high speeds are occasionally required, such components also have to be correspondingly designed for these high speeds in order to cope with the high temperatures associated therewith and to avoid damage, in particular in the seals, and to reduce the wear thereof.

The drive units, the associated transmissions, teeth, bearings and couplings may require continuous lubrication. In particular, due to the constant rotation of gears, shaft portions and other add-on components, the lubricant is continuously swirled and distributed and/or atomized in the associated housing portions. As a result of the swirling and the extensive distribution, the level of lubricant decreases in the housing and the return flow thereof is delayed so that, in particular, the internal region of the transmission in the vicinity of the rotational axes, the shaft bearing system and the shaft seals may no longer be sufficiently lubricated. As compensation, a greater quantity of lubricant may be provided in the housing. However, this in turn may lead to a greater loss of lubricant through the seals since a pumping movement which transports the lubricant out of the housing is also carried out by the rotation of the mobile parts. Moreover, a higher level of lubricant leads to greater splash losses and thus to an increased energy consumption. In the case of seals which are not designed for a constant mass flow, the pumping actions may also lead to an increase in wear.

Figure 1:
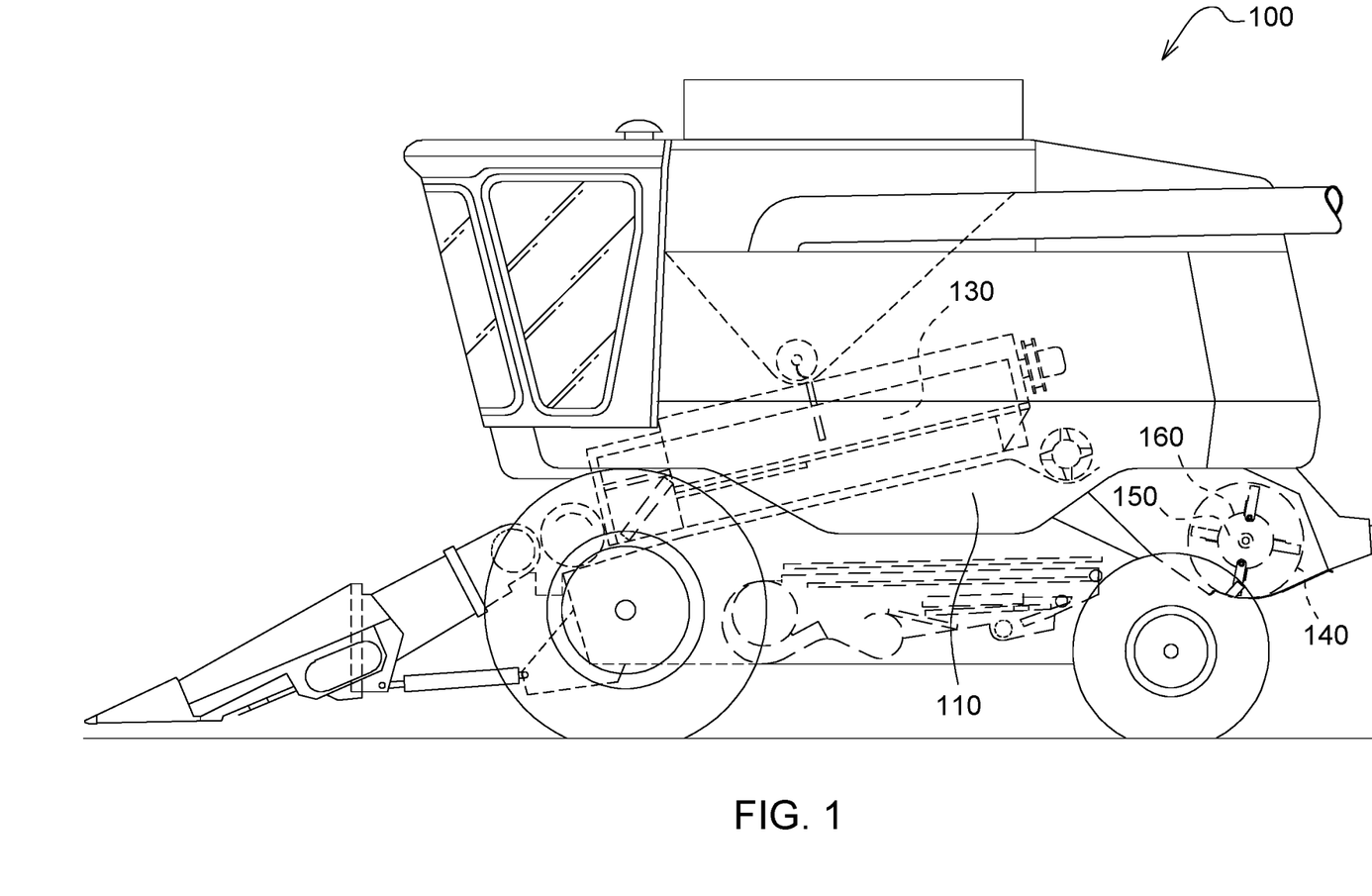
FIG. 1 illustrates a harvesting machine in accordance with an embodiment of the present disclosure.

FIG. 1 shows a self-propelled agricultural machine 100 which is configured by way of example in the form of a combine harvester. It is practicable that the exemplary embodiment which is described in more detail hereinafter may also be configured on a different type of self-propelled agricultural machine 100, for example a forage harvester, a mowing machine, a sugar cane harvester or a baler. The agricultural machine 100 has a machine housing 110 and a first processing device in the form of a threshing device 130 with an axial rotor oriented in the longitudinal direction of the agricultural machine 100. The agricultural machine 100 is driven by an internal combustion engine (not shown). The internal combustion engine is connected on the output side to a drive belt, a further processing device, in this case a chopping device 140 with a chopping drum 150, being driven thereby. To this end the drive belt is connected to a belt pulley 160 which serves as a drive element for a transmission of the chopping device 140.

Figure 2:
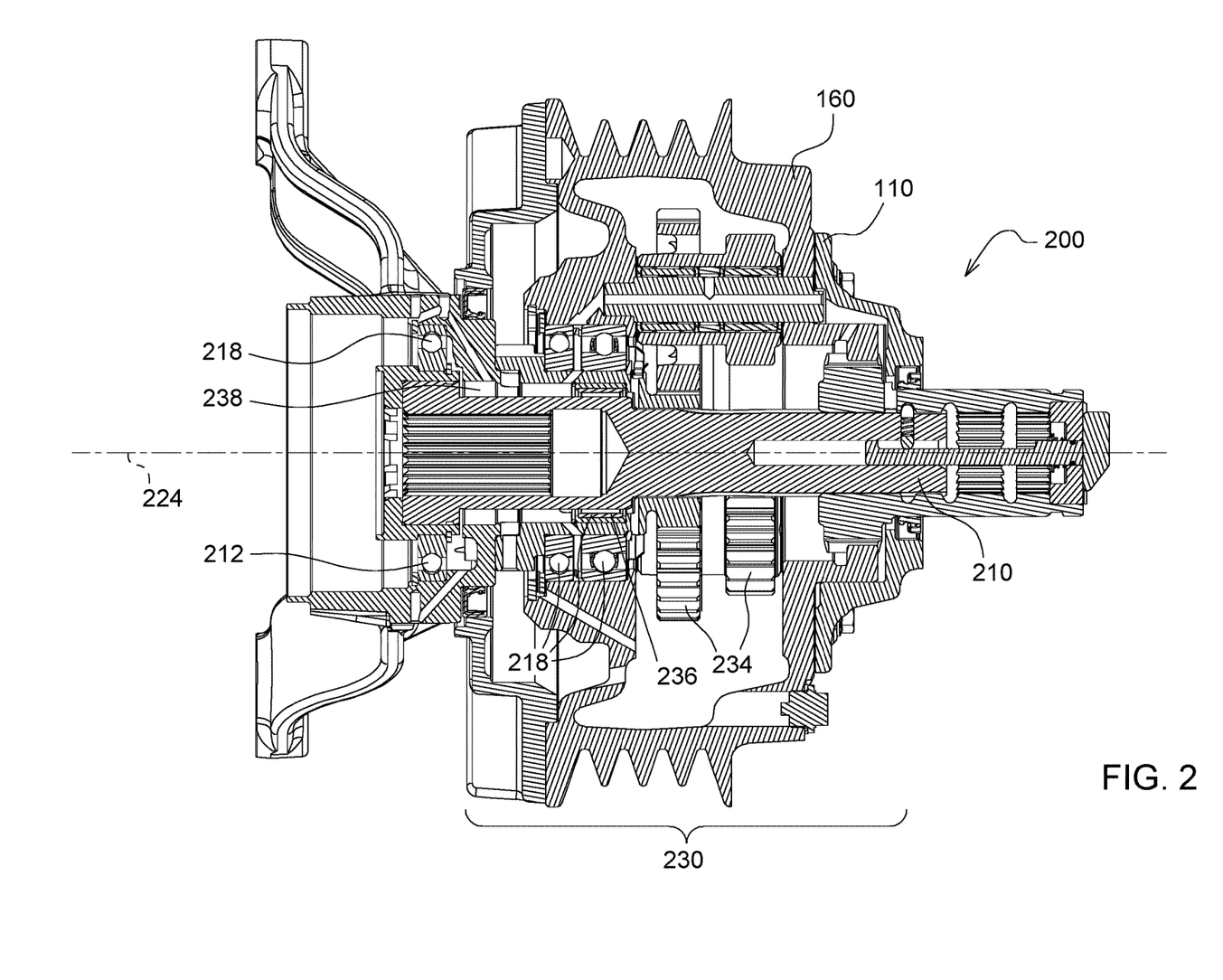
FIG. 2 illustrates a transmission with a belt drive in accordance with an embodiment of the present disclosure.

The transmission is shown in detail in FIG. 2 and comprises, in addition to the belt pulley 160, a double planetary gear set mounted in the belt pulley 160, wherein the belt pulley 160 serves as a planet carrier, an internal toothing configured in the belt pulley 160, as well as a transmission shaft 210 which serves as an output shaft and which for driving the chopping drum 150 is able to be connected thereto.

The transmission further comprises a hub which is configured as a hollow profile and which, relative to the belt pulley 160, comprises an internal part and an external part connected fixedly in terms of rotation thereto. The external hub part is connected fixedly in terms of rotation to a fastening flange which is configured on the machine housing 110. A sun gear which is in engagement with a first planetary gear set of the double planetary gear set is configured on the internal hub part. The hub further serves for bearing the belt pulley 160 and the transmission shaft 210, wherein the belt pulley 160 is axially fixed and rotatably mounted on the external peripheral side of the hub on the internal hub part. The transmission shaft 210 is axially fixed and rotatably mounted on the internal peripheral side of the hub, wherein a first bearing point 218 is configured on the external hub part and a second bearing point 218 is configured on the internal hub part.

The transmission shaft 210 has an external toothing at one end extending inside the belt pulley 160, and an internal toothing which is configured in a hollow space at one end extending inside the fastening hub. The internal toothing which is configured in the hollow space serves for connecting the transmission shaft 210 to the chopping device 140 and/or chopping drum 150. The transmission is further provided with a shifting device.

The housing 110 encompasses the transmission and one side of the belt pulley 160 and contains lubricant, generally lubricating oil, which serves for the lubrication and also for the transport of heat inside the housing 110. The transmission shaft 210 is rotatably held in the housing 110 by means of the bearing system 212 consisting of ball bearings and shaft bearings. The lubrication of the bearing system 212 and the rotating parts ensures the operating function and increases the service life. Due to the rotation of the shaft 210 and the components of the transmission in engagement therewith, the lubricant is distributed in the housing 110 by being swirled on the rotating surfaces. When the speed increases, the distribution rate also increases so that the lubricant is spun by the centrifugal forces onto the housing wall. Thus the lubricant is no longer available for the lubrication of the shaft 210 and the bearing system 212 thereof, until lubricant is returned along the housing surfaces. In particular in the case of longer-lasting and higher speeds, this results in the risk of an undersupply and a corresponding loss of lubrication film inside the bearings 218.

Figure 3:
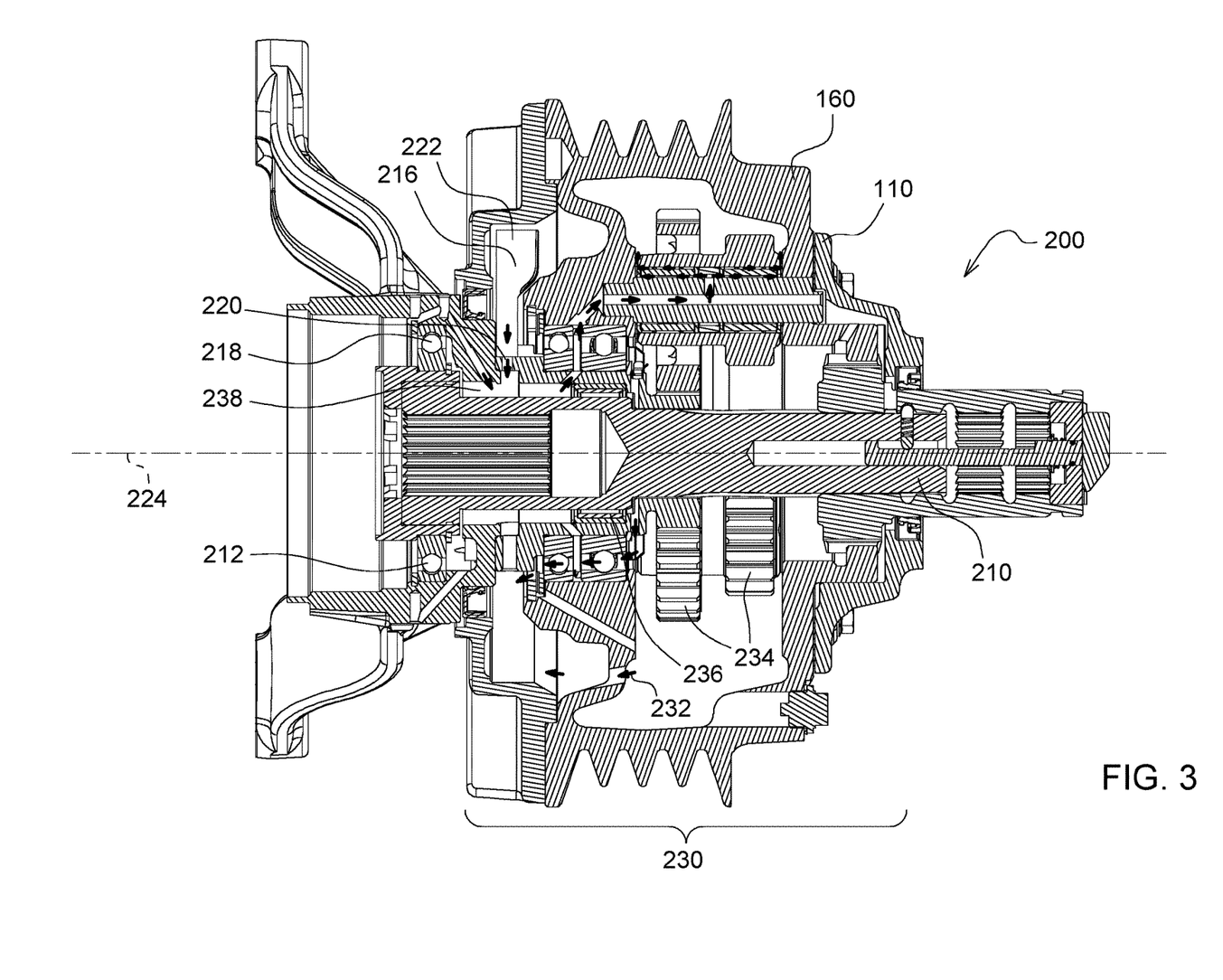
FIG. 3 illustrates a transmission in accordance with an embodiment of the present disclosure.

FIG. 3 shows an embodiment according to the present disclosure. In this case a lubricant deflector 216 is provided on the shaft 210. This lubricant deflector has an impact surface 222 which serves for collecting the lubricant swirled from the shaft 210 and the components connected thereto and for conducting the lubricant back to a central housing region. The lubricant deflector 216 is fastened to a portion of the housing 110 and may be held thereon in a bore 220. By means of the bore 220 the lubricant is able to drain away in a targeted manner onto an intermediate space 238 which is defined on one side by a bearing 218, and supply the bearing 218. The lubricant deflector 216 is fastened to an upwardly oriented portion of the housing 110, so that the lubricant is able to drain away by the action of gravity. The bore 220 may be connected by a channel to an intermediate space 238 or positioned directly adjacent to a bearing 218. In particular, needle bearings which are of very small construction may be supplied with lubricant by the lubricant deflector 216 on the shaft 210.

Due to the lubricant deflector 216, a lubricant circuit 232 is created as is shown in FIG. 3. By the diversion of lubricant onto the shaft 210 and the bearing system 212 and by the rotation of the shaft 210 during operation, a lubricant flow 232 is created which initially flows from the lubricant deflector 216 through the bearing system of the shaft 210, in order to pass through a shaft portion with the planet gears in a second partial flow. Starting from the planets, a further partial flow passes through the bearings 218 in the axial direction and emerges at an axial end of the belt pulley 160 in the housing 110. This throughflow ensures the lubrication and the heat dissipation. Subsequently, the lubricant is distributed in the housing 110 by the spinning action of the rotating parts and the circuit starts once again.

Figure 4:
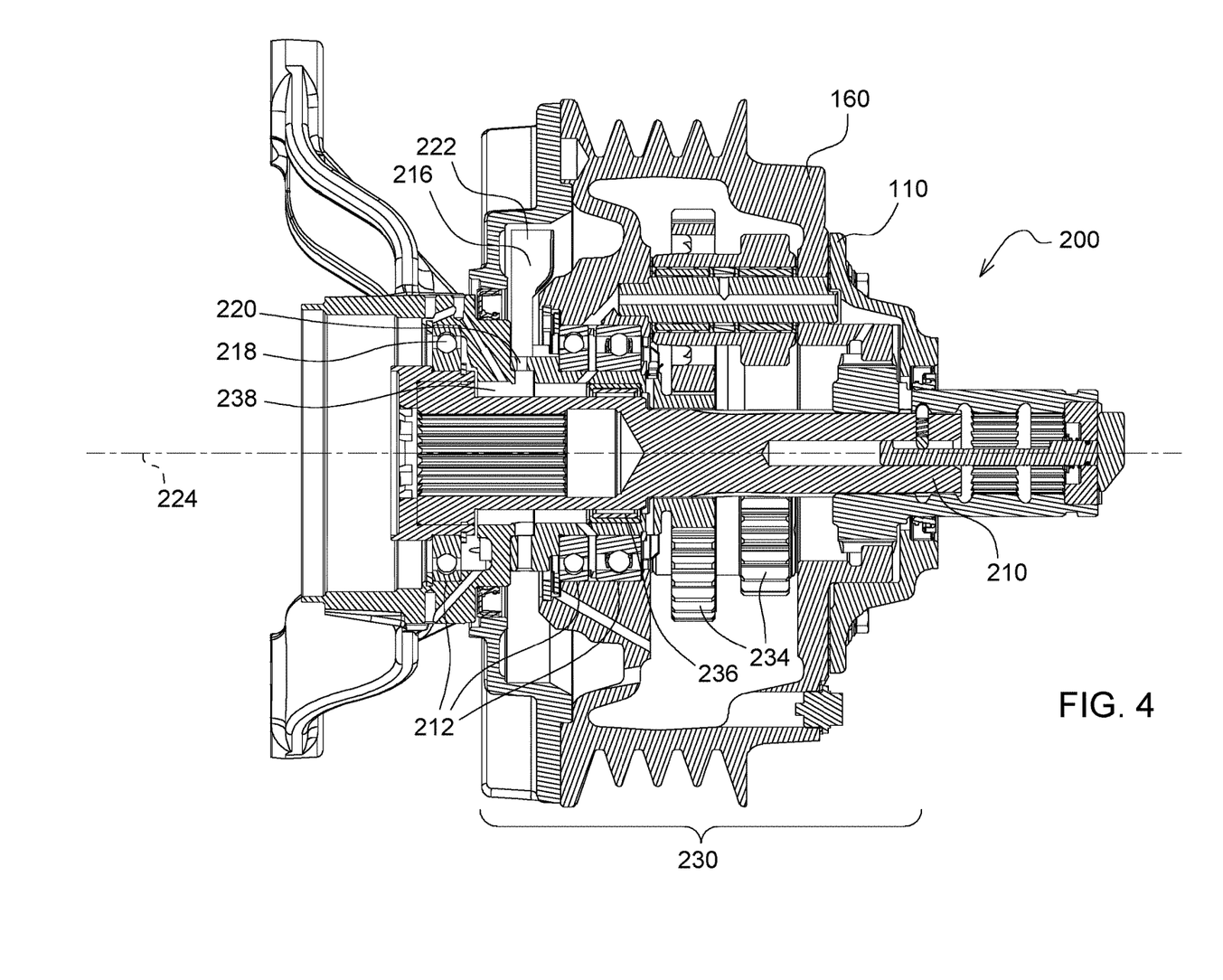
FIG. 4 illustrates a transmission in accordance with an embodiment of the present disclosure.

FIG. 4 shows a section of an embodiment according to the present disclosure without the lubricant circuit. The lubricant deflector 216 has an impact surface 222 which is oriented counter to the rotational direction of the shaft 210 or the rotational directions of the belt pulley 160 or of the transmission. Even in the case of longer-lasting and higher speeds, the lubricant supply may be maintained by conducting the lubricant using channels, bores, openings and intermediate spaces. Generally, the designated transmissions are operated at 1000 to 4000 revolutions per minute, preferably 1500 to 3500, particularly preferably at 2000 to 3000 revolutions per minute. FIG. 4 corresponds to FIG. 3 in all of the parts shown.

Figure 7:
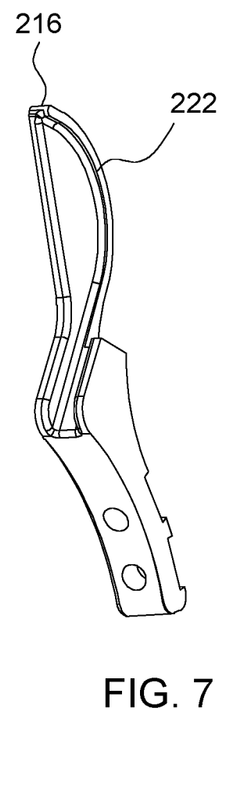
FIG. 7 illustrates a lubricant deflector in accordance with an embodiment of the present disclosure.
Figure 8:
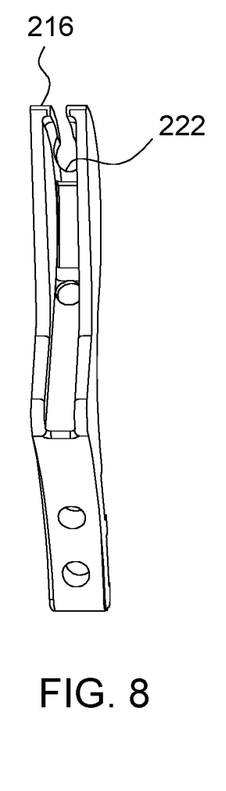
FIG. 8 illustrates a lubricant deflector in accordance with an embodiment of the present disclosure.
Figure 9:
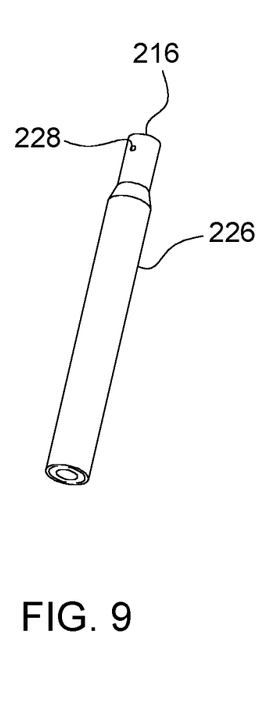
FIG. 9 illustrates a lubricant deflector in accordance with an embodiment of the present disclosure.

FIGS. 5 to 9 show various embodiments of the lubricant deflector 216 according to the present disclosure. All of the embodiments except for FIG. 9 have bores for fastening to the housing 110. However, other types of fastening may be present. FIG. 9 shows a tubular design so that the lubricant deflector 216 may be fastened by a press-fit or clamped by means of an additional screw connection. This may also be provided for the further embodiments.

Figure 5:
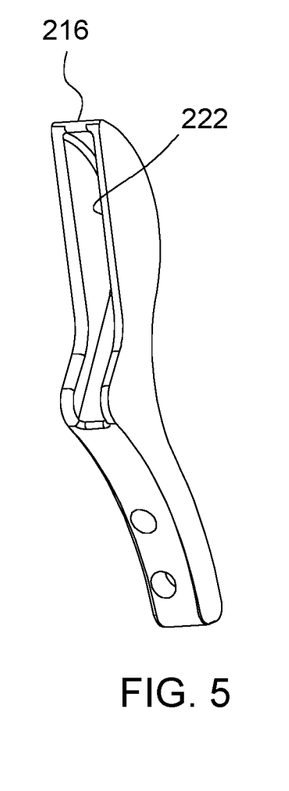
FIG. 5 illustrates a lubricant deflector in accordance with an embodiment of the present disclosure.

In FIG. 5 the lubricant deflector 216 has a blade shape, impact surfaces 222 being present in the interior thereof and lubricant which is distributed and atomized being able to be collected thereby and being able to run down the internal surface of the blade, which is defined by two side walls, in the direction of gravity. The collection and diversion of the lubricant may be influenced by the width and height of the impact surfaces 222 and the blade, so that depending on the dimensions an adaptation may be made to the specific requirements of the transmission.

Figure 6:
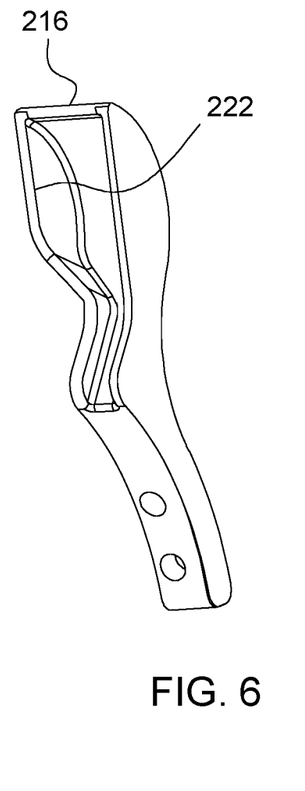
FIG. 6 illustrates a lubricant deflector in accordance with an embodiment of the present disclosure.

FIG. 6 shows a lubricant deflector 216 which is configured asymmetrically in the region of the blade-like impact surfaces 222. As a result, the return flow may be adapted to specific constructional requirements and to restrictions in terms of constructional space.

FIG. 7 shows a narrow lubricant deflector 216 which has impact surfaces 222 in the form of a peripheral edge on one side of the lubricant deflector 216. The quantity of collected lubricant may be influenced by the height of the peripheral edge, which extends in the installed state in the axial direction, and the radial height. The embodiment is suitable, in particular, for restrictions in terms of very limited constructional space.

FIG. 8 shows a lubricant deflector 216 which has at least one bore on a rear face. By the provision of bores in the impact surfaces 222 a simple adaptation may be made to the desired lubricant return rate. Other types of openings may also be incorporated in the impact surfaces 222, for example oval, angled openings and through-passages. The embodiment also has a through-passage on the upper edge in order to influence the return flow rate.

FIG. 9 shows an embodiment as a tube 226. Counter to the rotational direction or to the distribution direction of the lubricant, the tube 226 has an opening 228 through which lubricant enters and is able to be returned to the interior. The return rate may be adjusted by means of the diameter of the bore, but also by the diameter of the tube 226, since on its outer face lubricant may also be collected and returned, even to a limited extent, wherein this lubricant is not passed back into the bore 220. This embodiment permits a very accurate adjustment range for the return rate of the lubricant through the interior and through the bore 220 into the intermediate space 238 between the bearings 218 and the housing 110. The pressure in the lubricant flow may be very accurately adjusted by the small opening 228, wherein a return rate which is too high may be avoided in order to prevent damage, in particular, to the seals. The pressure may be very accurately adjusted by means of the embodiment.

Figure 10:
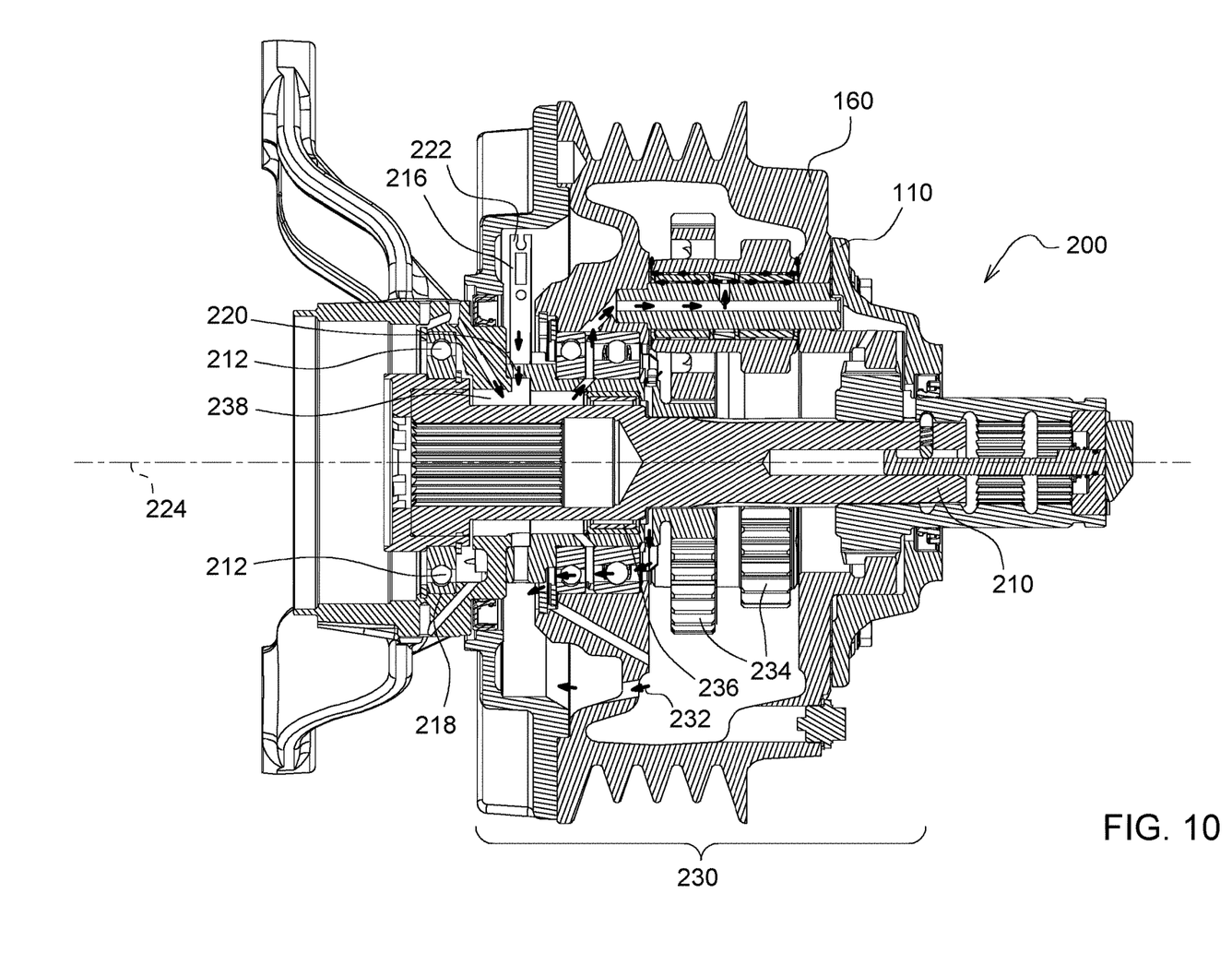
FIG. 10 illustrates a transmission in accordance with an embodiment of the present disclosure.

FIG. 10 shows a further embodiment of the lubricant deflector 216 according to the version according to FIG. 8. In comparison with the exemplary embodiment according to FIG. 2 or 4, already shown, the narrower design is apparent. As a result, in addition to the openings present in the impact surfaces 222, less lubricant is collected. Consequently, the same transport of lubrication film is initiated but at a lower flow rate, resulting in the seals being subjected to less load.

It should be appreciated that the embodiments shown may result in variable flow rates. An adaptation to different bearing positions, to the number of bearings, transmission design and speed level may also be made by repositioning the lubricant deflector 216.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A lubrication arrangement, comprising:
   at least one housing;
   at least one shaft;
   at least one bearing system configured to hold the at least one shaft in the at least one housing and to permit the at least one shaft to rotate;
   lubricant distributed in the at least one housing with the rotation of the at least one shaft; and
   a lubricant deflector provided in a stationary manner relative to the at least one housing above the at least one shaft;
   wherein the lubricant strikes against the lubricant deflector and, by action of gravity, the lubricant is conducted to the at least one bearing system of the at least one shaft so that the at least one bearing system is supplied with the lubricant;
   wherein the at least one housing has a bore, and the lubricant is configured to drain off the lubricant deflector into the bore by the action of gravity before being conducted to the at least one bearing system; and
   wherein the lubricant deflector has an impact surface oriented parallel to a longitudinal axis of the at least one shaft and oriented counter to a rotational direction of the at least one shaft so that the lubricant is spun onto the impact surface and runs down the lubricant deflector.

2. The lubrication arrangement of claim 1, wherein the lubricant deflector is fastened in a housing region adjacent to a bearing.

3. The lubrication arrangement of claim 1, wherein the lubricant deflector is directly fastened in the bore.

4. The lubrication arrangement of claim 1, wherein the lubricant deflector is a tube with an opening at an upper end provided counter to a rotational direction of the at least one shaft, so that the lubricant is conveyed into the opening by the rotation and runs down inside the tube.

5. The lubrication arrangement of claim 1, wherein the lubricant deflector has a substantially L-shaped cross section.

6. The lubrication arrangement of claim 1, wherein the lubricant deflector has a substantially U-shaped cross section.

7. The lubrication arrangement of claim 1, wherein the lubricant deflector is oriented upwardly to drain the lubricant by action of gravity through the bore and into an intermediate space defined on one side of the at least one bearing system before supplying the bearing system with the lubricant.

8. The lubrication arrangement of claim 1, wherein the lubricant deflector is provided only above the at least one shaft.

9. The lubrication arrangement of claim 1, wherein the lubricant deflector comprises a return flow adjuster configured to influence a rate of lubricant flow through the bore.

10. A transmission arrangement having a lubrication arrangement, the transmission arrangement comprising:
    at least one housing;
    at least one shaft;
    at least one bearing system configured to hold the at least one shaft in the at least one housing and to permit the at least one shaft to rotate;
    lubricant distributed in the at least one housing with the rotation of the at least one shaft; and
    a lubricant deflector provided in a stationary manner relative to the at least one housing above the at least one shaft;
    wherein the lubricant strikes against the lubricant deflector and, by action of gravity, the lubricant is conducted to the at least one bearing system of the at least one shaft so that the at least one bearing system is supplied with the lubricant;
    wherein the at least one housing has a bore, and the lubricant is configured to drain off the lubricant deflector into the bore by the action of gravity before being conducted to the at least one bearing system; and
    wherein the lubricant deflector has an impact surface oriented parallel to a longitudinal axis of the at least one shaft and oriented counter to a rotational direction of the at least one shaft so that the lubricant is spun onto the impact surface and runs down the lubricant deflector.

11. The transmission arrangement of claim 10, wherein the lubricant deflector is oriented upwardly to drain the lubricant by action of gravity through a bore of the at least one housing and into an intermediate space in the at least one housing defined on one side of the at least one bearing system before supplying the bearing system with the lubricant.

12. The transmission arrangement of claim 10, wherein the lubricant deflector is provided only above the at least one shaft.

13. The transmission arrangement of claim 10, wherein the lubricant deflector comprises a return flow adjuster configured to influence a rate of lubricant flow through a bore of the at least one housing.

14. A lubrication arrangement, comprising:
    at least one housing;
    at least one shaft;
    at least one bearing system configured to hold the at least one shaft in the at least one housing and to permit the at least one shaft to rotate;
    lubricant distributed in the at least one housing with the rotation of the at least one shaft; and
    a lubricant deflector provided in a stationary manner relative to the at least one housing above the at least one shaft;
    wherein the lubricant strikes against the lubricant deflector and, by action of gravity, the lubricant is conducted to the at least one bearing system of the at least one shaft so that the at least one bearing system is supplied with the lubricant; and
    wherein the lubricant deflector is a tube with an opening at an upper end provided counter to a rotational direction of the at least one shaft, so that the lubricant is conveyed into the opening by the rotation and runs down inside the tube.

15. The lubrication arrangement of claim 14, wherein the lubricant deflector is oriented upwardly to drain the lubricant by action of gravity through a bore of the at least one housing and into an intermediate space in the at least one housing defined on one side of the at least one bearing system before supplying the at least one bearing system with the lubricant.

16. The lubrication arrangement of claim 14, wherein the lubricant deflector is provided only above the at least one shaft.

17. The lubrication arrangement of claim 14, wherein the lubricant deflector comprises a return flow adjuster configured to influence a rate of lubricant flow through a bore of the at least one housing.

* * * * *